(12) United States Patent
Winchell et al.

(10) Patent No.: US 11,212,212 B2
(45) Date of Patent: Dec. 28, 2021

(54) NON-ISOLATED TOPOLOGIES IN COMPUTING NETWORK ENVIRONMENTS

(71) Applicant: Hewlett Packard Enterprise Development LP, Houston, TX (US)

(72) Inventors: Dave Winchell, Nashua, NH (US); Chris Franklin, Nashua, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/849,069

(22) Filed: Apr. 15, 2020

(65) Prior Publication Data

US 2021/0328904 A1  Oct. 21, 2021

(51) Int. Cl.
*H04L 12/751* (2013.01)
*H04L 12/721* (2013.01)
*H04L 12/703* (2013.01)
*H04L 12/753* (2013.01)

(52) U.S. Cl.
CPC ............ *H04L 45/02* (2013.01); *H04L 45/12* (2013.01); *H04L 45/28* (2013.01); *H04L 45/48* (2013.01)

(58) Field of Classification Search
CPC combination set(s) only.
See application file for complete search history.

(56) References Cited

U.S. PATENT DOCUMENTS

| | | | |
|---|---|---|---|
| 9,337,931 | B2 | 5/2016 | Srinivas et al. |
| 9,466,041 | B2 * | 10/2016 | Simitsis ............. G06Q 10/0633 |
| 2005/0135804 | A1 | 6/2005 | Rashid et al. |
| 2008/0031156 | A1 | 2/2008 | Balasubramaniam et al. |
| 2011/0090787 | A1 * | 4/2011 | Smith ................ H04L 45/32 370/225 |
| 2013/0028070 | A1 * | 1/2013 | Beheshti-Zavareh ........ H04L 45/48 370/217 |
| 2016/0191194 | A1 | 6/2016 | Wood et al. |
| 2016/0344618 | A1 * | 11/2016 | Oprea ............... H04L 45/12 |
| 2019/0268234 | A1 | 8/2019 | Cheng et al. |

FOREIGN PATENT DOCUMENTS

CN  110138830 A  8/2019

OTHER PUBLICATIONS

Fabien Geyer, "Performance Evaluation of Network Topologies using Graph-Based Deep Learning," Dec. 2017, pp. 1-8, ACM.

\* cited by examiner

*Primary Examiner* — Xavier S Wong
(74) *Attorney, Agent, or Firm* — Jaffery Watson Mendonsa & Hamilton

(57) ABSTRACT

Example implementations relate to management of network topologies. A primary tree having multiple connection graphs is generated for each node in the network. Each connection graph has at least one ordered list of one or more network node connections and the generated connection graphs provide a full network fit for each node in the network. The connection graphs are stored in at least one network switch to be used for network switch functionality. Additional connection graphs are generated for one or more network nodes connections based at least on network link capacity and provide for sharing of one or more of network links between multiple network node connections. The additional connection graphs are stored in the at least one network switch to be used for subsequent network switch functionality.

15 Claims, 8 Drawing Sheets

NON-ISOLATED TOPOLOGIES IN COMPUTING NETWORK ENVIRONMENTS

BACKGROUND

In order to function properly, networks of electronic devices are configured using a known or discoverable topology, or interconnection of devices. Often these topologies allow for multiple paths between devices. Choosing the path to be used for various transactions can be based on various factors. Thus, as networks grow the complexity of configuring and managing the network also grows. Accordingly, efficient network management tools are desirable.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
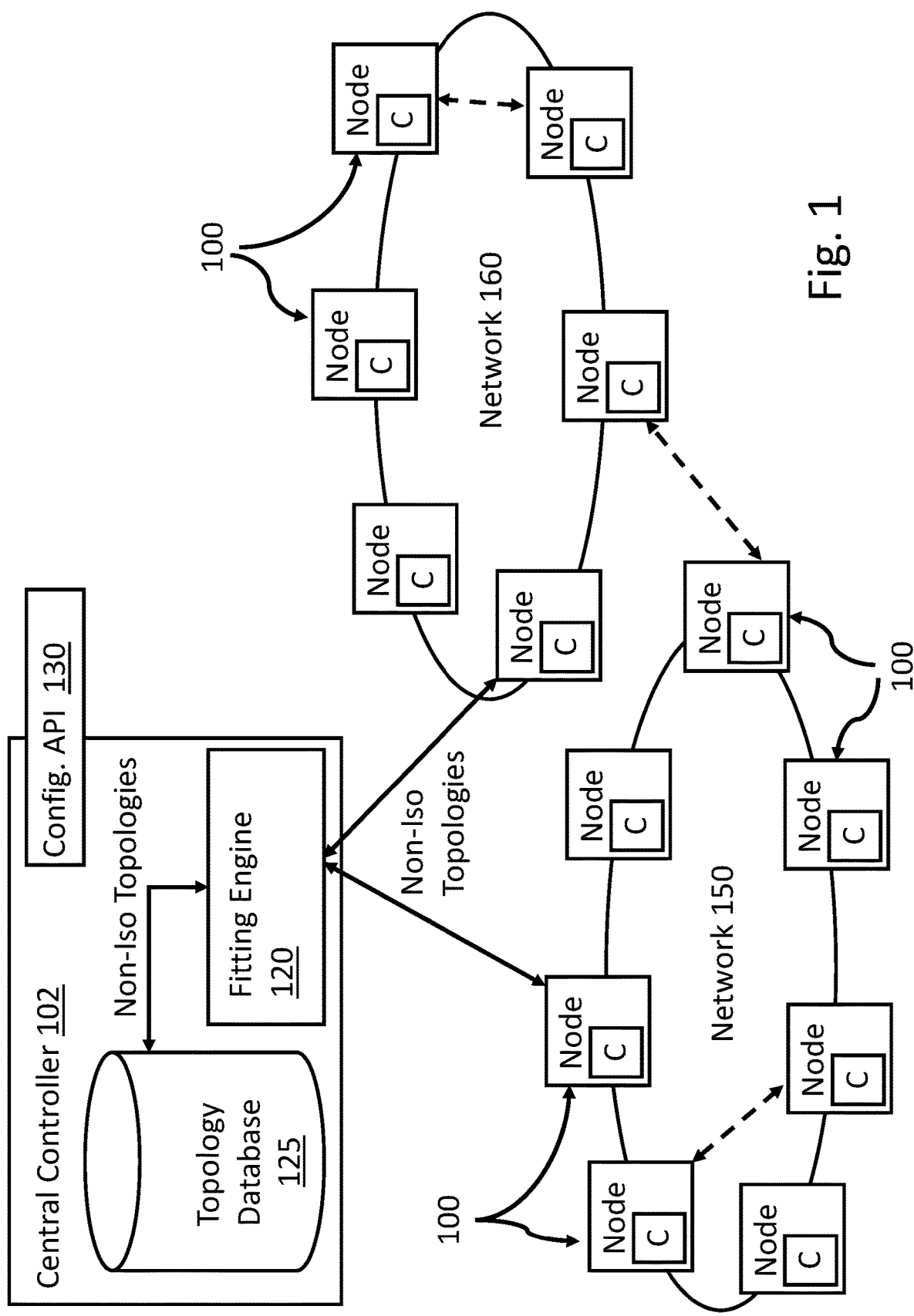
FIG. 1 is one embodiment of an example network that can utilize non-isolated topologies.

In the following description, numerous specific details are set forth. However, embodiments of the invention may be practiced without these specific details. In other instances, well-known structures and techniques have not been shown in detail in order not to obscure the understanding of this description.

A new topology paradigm is described herein that can be referred to as a "non-isolated topology" that provides at least shared use of links with policing and traffic shaping functionality. This can result in a more efficient network than previously possible. Traditionally, "isolated topologies" were utilized that required full path fits (described in greater detail below) that have associated cost in terms of latency and packet switching disruption. In contrast, use of non-isolated topologies allows for adding of new topologies in a lightweight fashion as partial path fits that result in reduced packet switching disruption. Advantages of the non-isolated topologies include, for example, the ability to create and support large numbers of topologies to satisfy unique requirements in terms of load, node participation and/or packet qualification.

As described in greater detail below, with shared links of the non-isolated topology, there are fewer constraints and the resulting paths can provide lower hop counts and higher diversity when compared to isolated topologies. In various embodiments discussed herein, a primary tree can be computed for each destination node in a network and, optionally, a list of backup trees can also be computed for some or all of the network nodes. In general, a link is a connection between two nodes in a graph, such as a network connection between two network nodes (e.g. switches).

Architectures and mechanisms for management of network topologies and associated flow tables will be described. In some embodiments, a primary tree, or base connection graph is generated for each node in the network. Each connection graph has at least one ordered list of one or more network node connections and the generated connection graphs provide a full network fit for each node in the network. The base connection graphs are stored in at least one flow table of a network switch. Additional connection graphs are generated for one or more network nodes connections based at least on network link capacity and provide for sharing of one or more of network links between multiple network node connections. The additional connection graphs are stored in the at least one flow table to be used for subsequent network switch functionality.

As described in greater detail below, a primary tree is rooted at each switch. In some embodiments, only a subset of graphs are passed to each node in the network rather than the whole graph. In one embodiment, only the graph(s) that the node needs are sent to the node. In some embodiments, each graph has an associated "out port" that indicates the port to take to get to the next switch.

In some situations, a port along the designated path to the destination may be down. To handle the down port situation, a list of out ports can be provided and the transmitting switch can utilize the first available (or valid) out port. Thus, in some embodiments, each port can have a "validity rule" that the controller can set to be the links in the path to the destination must be operational.

FIG. 1 is one embodiment of an example network that can utilize non-isolated topologies. In the example of FIG. 1, the network includes a plurality of physical or logical networks 150 and 160. Although two networks are depicted in FIG. 1, more or fewer networks may be present in other examples. Each of the networks 150, 160 includes a plurality of nodes 100, each of which is defined herein as a network node that can include ports for connection to host computers or other attached devices, ports that are connectable to other nodes 100 in the network, and a packet switch, a circuit switch, and/or an optical switch, as herein described. The network is a fabric network since the nodes 100 are interconnected via their network switches.

In one embodiment, each node 100 includes or has an associated co-resident controller ("C"). For example, the network 150 includes seven (7) nodes 100 that each have an associated co-resident controller; and the network 160 includes six (6) nodes 100 that have associated co-resident controllers. The respective nodes 100 can further include multicast/broadcast capable circuit switches (such as electrical cross-point or electrical cross-bar switches) in addition to the packet switches to increase the functionality of the nodes 100 and the network in which they are deployed, allowing capacity to be shifted and switch hop counts to be reduced based on network traffic, application requirements, and/or deployment requirements.

In some embodiments, the network further includes one or more governing central controllers 102, which can include Fitting Engine 120 and networking topology database 125. While illustrated as components of central controller 102, Fitting Engine 120 and networking topology database 125 may be located in another network element, such as a supervisory controller coordinating the operation of multiple central controllers 102. In various embodiments, some central controllers 102 can be hardware devices (e.g., electronic circuitry or logic) or any combination of hardware and programming to implement their respective functionalities described herein. For example, programming may include executable instructions stored on a non-transitory machine readable medium, such as random access memory (RAM), read-only memory (ROM), electrically erasable programmable read-only memory (EEPROM), flash memory, a hard disk drive, etc. Hardware may include a processing resource, such as a microcontroller, a microprocessor, central processing unit (CPU) core(s), application-specific integrated circuit (ASIC), a field programmable gate array (FPGA), and/or other hardware device suitable for retrieval and/or execution of instructions from the machine readable medium.

The one or more central controllers 102 may also be configured to receive network configuration requests which are specified through configuration API 130 (which may be provided on a user interface on the central controller 102 or on a remote device). Such network configuration requests may specify, for example, flows that can be added to specific network topologies (e.g., isolated or non-isolated). The flows, in turn, can have packet matching qualifiers, for example, [source tcp port=100].

In alternate embodiments, the network may be configured in any suitable physical or logical network configuration(s), including, but not limited to, mesh network configuration(s), linear network configuration(s), ring network configuration(s), chordal ring network configuration(s), multidimensional chordal ring network configuration(s), and/or 2-dimensional or higher torus network configuration(s). Such physical or logical network configuration(s) may include optical node(s), non-optical node(s), node(s) coupled to optical network(s), or node(s) coupled to non-optical network(s). For example, nodes 100 within a network may be connected to non-neighboring nodes (such as through a direct physical connection or via a passive optical connection through intermediary nodes 100) and/or nodes in one network may be connected to nodes in another network (some examples of which are illustrated as dashed lines in FIG. 1).

In one embodiment, each of the co-resident controllers associated with networks 150 and 160 are communicably coupled to central controller 102. For example, the co-resident controllers associated with the network 150 are each communicably coupled to central controller 102, and the co-resident controllers associated with network 160 are each communicably coupled to the same central controller 102. Alternatively, multiple central controllers 102 may be provided such that co-resident controller associated with different networks may be communicably coupled to different central controllers 102.

In one embodiment each co-resident controller can send one or more messages to the respective central controller 102 communicably coupled thereto. Each of the central controllers 102, can receive and process the messages sent to it by the co-resident controllers, and control the respective co-resident controllers. Central controller 102 can control each of the respective co-resident controllers included in networks 150 and 160.

In some embodiments, central controller(s) 102 may perform load balancing with regard to both inter-network traffic carried between the networks 150 and 160, and intra-network traffic within each individual network. In addition, the central controller(s) 102 can access information pertaining to the network topology from the networking topology database. Having received the network topology information, the central controller(s) 102 can control some or all of the co-resident controllers to modify and/or implement the network topology across the respective networks 150 and 160.

As described in greater detail below, central controller 102, by utilizing fitting engine 120 and/or topology database 125, various topologies can be utilized by networks 150 and 160. When utilizing non-isolated topologies, the operational efficiency of networks 150 and 160 can be improved.

Figure 2:
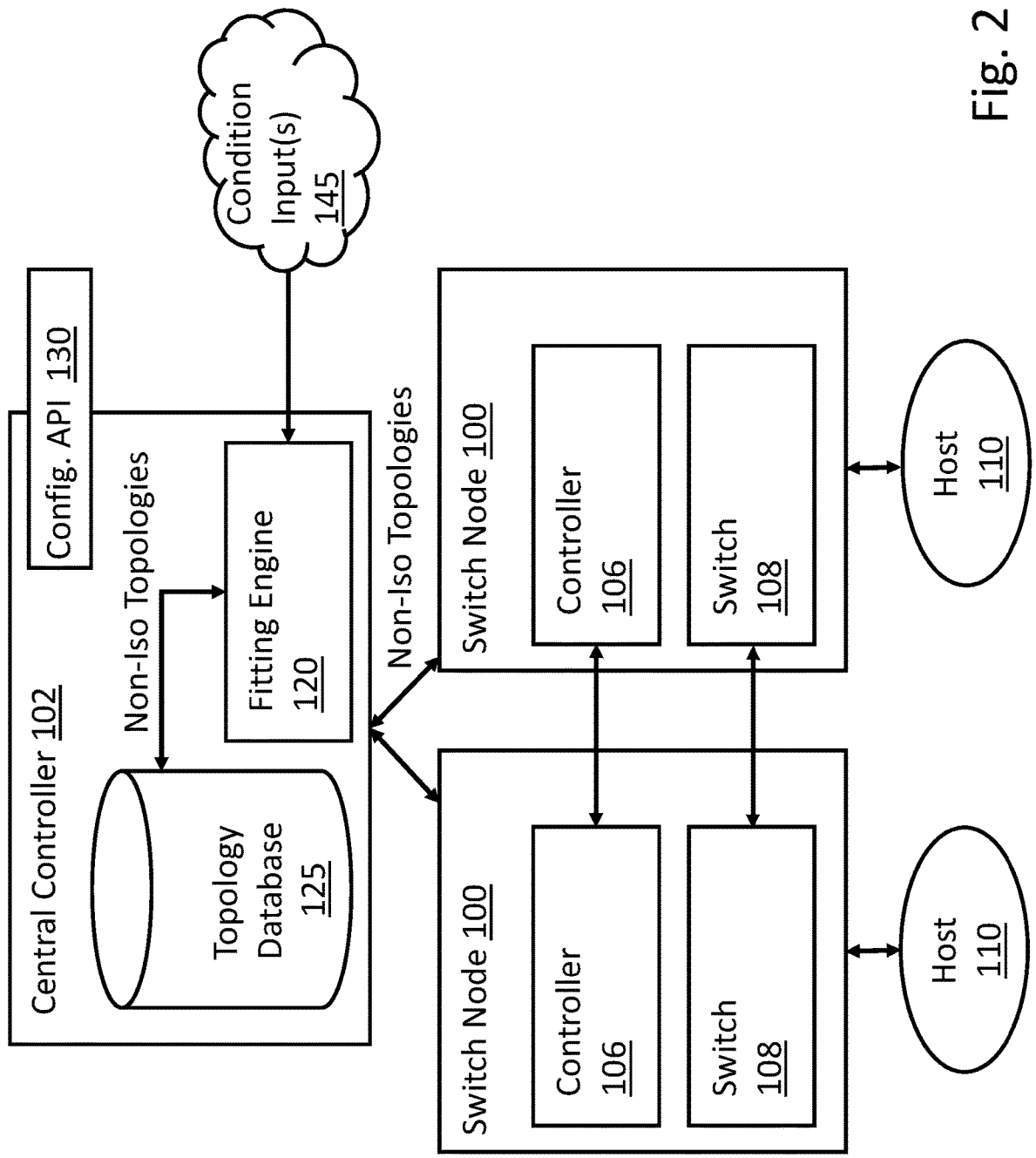
FIG. 2 is a block diagram of one embodiment of physical or logical network that can operate utilizing non-isolated topologies.

FIG. 2 provides another view of the physical or logical network, in which central controller 102 is communicably coupled to the plurality of switch nodes 100 to provide non-isolated topologies. As shown in FIG. 2, central controller 102 includes fitting engine 120 and topology database 125. Further, switch nodes 100 each include a co-resident controller 106 and a packet/circuit switch 108. Switches 108 interconnect the respective switch nodes 100 through their ports over a plurality of communication channels. In addition, switch 108 connects switch node 100 through its access ports to at least one host 110 over at least one access link, or, in some cases, through an external switch/router which then connects to host 100, possibly through another network. In some embodiments, the switch may be a "white box switch" which is a switch that omits circuit switch 108 such that there is no layer 1 crossbar and relies on L2/L3 routing.

Central controller 102 (e.g., central controller 102 in FIG. 1) can modify and implement network topologies within the network(s) associated therewith. These topologies can include non-isolated topologies. In the network of FIG. 2, this can be achieved by central controller 102 using fitting engine 120. Alternatively, central controller 102 may receive the network topology from an external source (e.g., configuration API 130), such as another central controller 102, a user, etc.

In one embodiment, fitting engine 120 within central controller 102 can receive, as inputs, one or more condition inputs (145), which can include, for example: a current network topology (e.g., circuit switch settings, layer-1 link status, layer-2 link status), MAC addresses of peer nodes 100 on each port (e.g., learned via the link layer discovery protocol (LLDP) or the supervisor channel), MAC addresses on the access ports, BUM (Broadcast, Unknown Unicast, and Multicast traffic) links, etc. Additional and/or different inputs (e.g., current configuration state of topology plane P3 (where the P3 plane is the fitting computed topology)), and the current configuration state of topology plane P2 (where the P2 plane is the control plane topology autonomously created and managed by the switches)), and an affinity topology (e.g., the affinity elements, the affinity groups, and the affinity links, including affinity link requirements and attributes) can also be utilized.

From the perspective of fitting engine 120, the affinity-network topology represents a workload abstraction layer. Fitting engine 120 can further receive, as condition input(s) 145, some or all of the following information pertaining to network configuration: various network statistics (e.g., the aggregate link-level statistics such as link utilization, byte counts, queue depths, etc., per-VLAN link-level statistics, per-source/destination MAC pair link-level statistics, and per granular flow level statistics), and circuit switch configuration capabilities (e.g., a list of transceiver and circuit switch capabilities and internal connectivity diagram per switch). Additional and/or different inputs can also be utilized.

As shown, switch nodes 100 include both co-resident controller 106 and circuit switch 108. In various embodiments, controllers 106 can be hardware devices (e.g., electronic circuitry or logic) or any combination of hardware and programming to implement their respective functionalities described herein. For example, programming may include executable instructions stored on a non-transitory machine readable medium, such as random access memory (RAM), read-only memory (ROM), electrically erasable programmable read-only memory (EEPROM), flash memory, a hard disk drive, etc. Hardware may include a processing resource, such as a microcontroller, a microprocessor, central processing unit (CPU) core(s), application-specific integrated circuit (ASIC), a field programmable gate array (FPGA), and/or other hardware device suitable for retrieval and/or execution of instructions from the machine readable medium.

In some embodiments, switch nodes 100 may omit circuit switch 108 in order to operate with just co-resident controller 106—for example, as a white box switch performing software defined routing/switching. In some embodiments, the actual routing/switching of a white box is performed by hardware elements.

Data packets traveling through the network may be handled at various layers—the L1 physical layer, the L2 data link layer or the L3 network layer. Circuit switch 108, such as a crossbar, operates as an L1 element by physically forwarding the data packets through electrical/optical elements. Using hardware and software based memory elements to determine data packet forwarding allows switch node 100 to provide L2 and L3 layer functionality.

Figure 3:
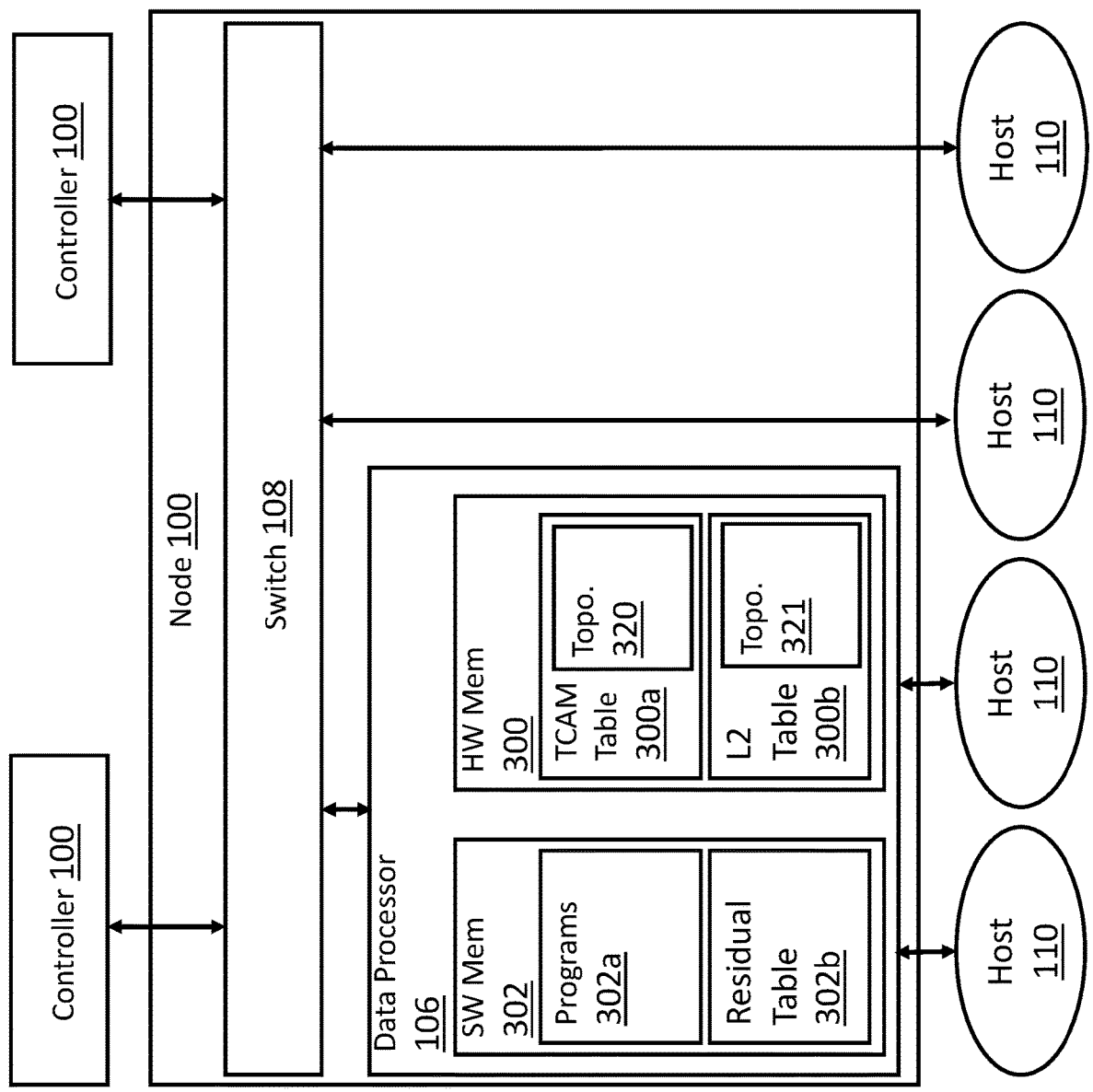
FIG. 3 is a block diagram of one embodiment of a switch node 100 that can utilize non-isolated topologies.

FIG. 3 is a block diagram of one embodiment of a switch node 100 that can utilize non-isolated topologies. Switch node 100 includes circuit switch 108 and data processor (or co-controller) 106. While the data processor is shown as housing hardware memory 300 and software memory 302, the memory may also be embodied in separate elements on switch node 100.

In one embodiment, hardware memory 300 includes ternary content addressable memory (TCAM) that stores a TCAM table 300a and a second, larger memory element, storing L2 table 300b. TCAM table 300a may include a limited number of entries where each entry may include various fields. In contrast, L2 table 300b may have many more entries (for example, ten (10) to twenty (20) times the number of entries in TCAM table 300a or more) but with fewer fields per entry. This allows TCAM table 300a to be more granular and powerful, such as by enabling the system to prioritize packets, differentiated by a combination of various fields in the packet header. Hardware memory 300 can be utilized to store topologies (e.g., 320, 321) including isolated and non-isolated topologies.

Software memory 302 provides additional storage capability. Software memory 302 may store software programs 302a in addition to residual table 302b. Software memory 302 may also include back-up copies of the TCAM table 300a and the L2 table 300b.

Additionally, entries in the various tables can include information duplicated across the tables. In one embodiment, residual table 302b includes entries with all data fields for each entry in either TCAM table 300a or L2 table 300b. Similarly, TCAM table 300a and L2 table 300b may have entries for the same flow but have different fields for those entries. In this way, if a flow's entry is removed from one table due to lack of use (e.g., from the TCAM), an entry in another table may provide routing data should the flow resume.

In one embodiment, switch node 100 is connected to other switch nodes 100 (or co-controllers 106) through circuit switch 108. Hosts 110 connected to switch node 100 may be linked directly to the data processor 106 or to circuit switch 108. Circuit switch 108 may be configured to directly connect inports to outports, for example, to provide L1 connections between neighboring switch nodes 100 or to provide an L1 connection between a neighboring switch node 100 and an attached host 110, such as through a crossbar element. Circuit switch 108 may also be configured to route various inports to the data processor which then controls the routing, for example, by reconfiguring circuit switch 108 to provide L1 connections or by redirecting data packets to the appropriate outport/host 110.

Figure 4:
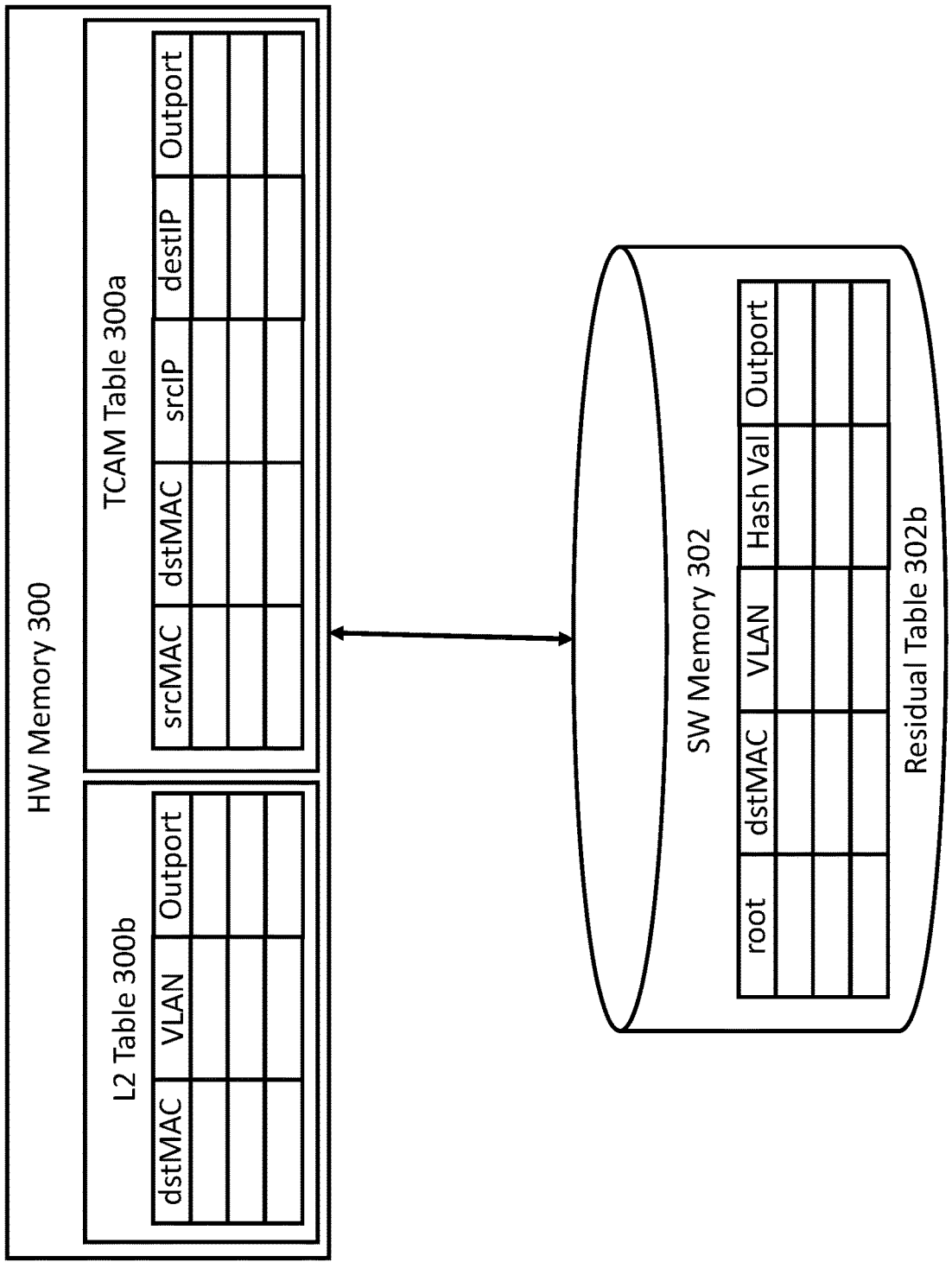
FIG. 4 is a block diagram of one embodiment of switch node memory elements that can utilize non-isolated topologies.

FIG. 4 is a block diagram of one embodiment of switch node memory elements that can utilize non-isolated topologies. Hardware memory 300 while shown as a single element includes multiple subcomponents, for example, a ternary content addressable memory (TCAM) is used for TCAM table 300a. As shown, TCAM table 300a includes fields for data to be compared to packet message headers. In this example, the TCAM table 300a has fields for the source MAC address, the destination MAC address, the source IP address, the destination IP address and an outport. L2 table 300b, in some implementations, may have a more limited number of fields for each entry. L2 Table 300b may include the destination MAC address, the virtual local area network (VLAN) and the outport, for example.

Software memory 302 is shown as including residual table 302b having fields for the root node address, the destination MAC address, VLAN, hash value and the outport. Software memory 302 may also include local copies of L2 Table 300b and TCAM Table 300a. These may also be used as backup copies. In further embodiments, TCAM table 300a, L2 table 300b and residual table 302b may include more and/or different fields. For example, TCAM table 300a may include VLAN and TCP port data.

In other embodiments, residual table 302b may include a level field indicating which level in a plurality of levels within the table is assigned to the entry. The table may be evaluated for a matching glow entry in order of increasing levels and stopping once a match is found. In this embodiment, the order of the entries within an individual level may not matter. Glows may be assigned to higher levels in order to provide a granular approach and the lower level glow entries can be used to catch flows which do not match glow entries in the higher levels. Each glow describes at least one flow of network traffic and role instructions for the switching node when handling the at least one flow.

For example, a first glow encompassing all flow of a particular VLAN to a specific destination MAC address may be assigned to level 100 and a second glow which encompasses flows of the particular VLAN to any destination MAC address but which are within to a given hash bucket (e.g., Hash(VLAN, dstMAC)=[0, 60]; may be assigned to a lower level (e.g., level 300). In this example, a single flow may satisfy the destination of both glows; however, the higher level glow (level 100) would be matched to the flow first.

Figure 5:
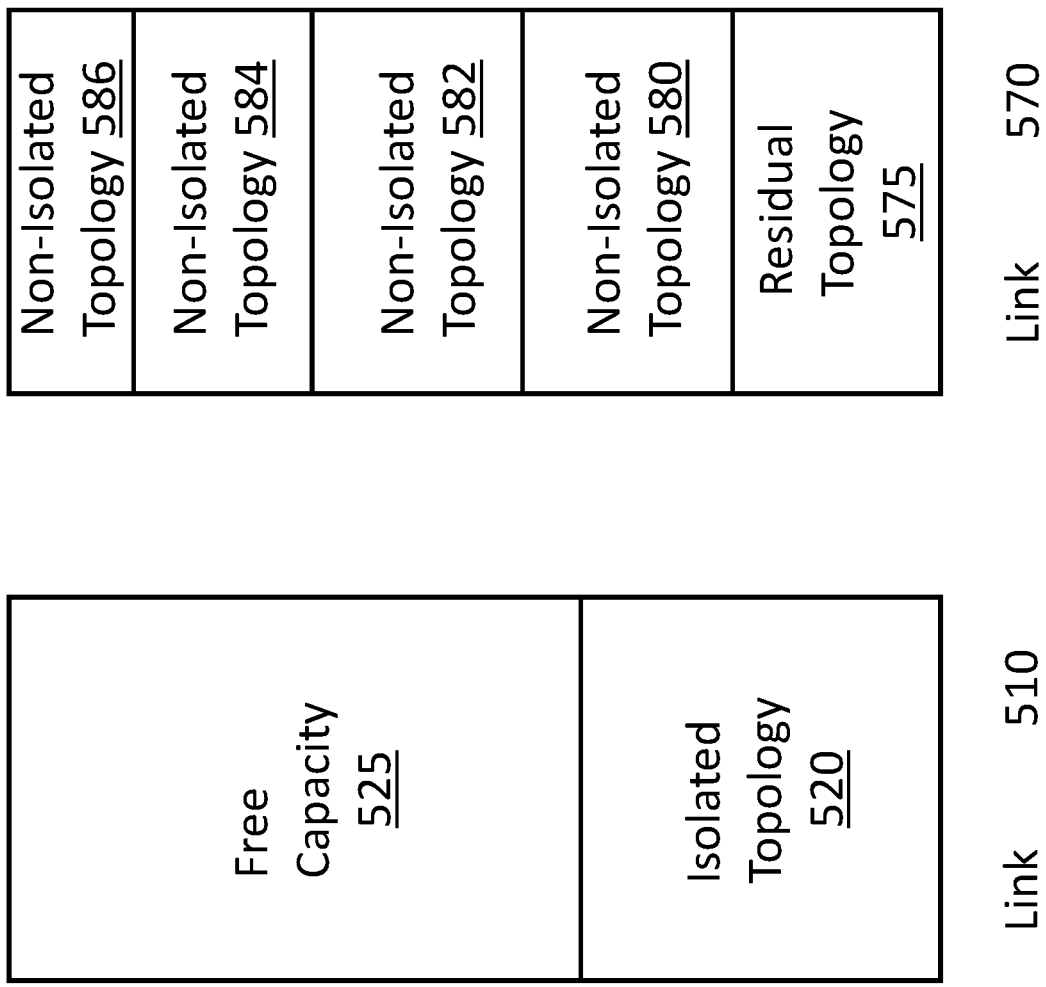
FIG. 5 is a conceptual illustration of link utilization with non-isolated topologies.

FIG. 5 is a conceptual illustration of link utilization with non-isolated topologies. The links of FIG. 5 represent two links in a multi-link environment. Complex environments can have hundreds or thousands of links that can be configured with isolated topologies or non-isolated topologies.

The example of FIG. 5 illustrates conceptually how unused space on a residual link can be utilized (or shared) with multiple non-isolated topologies. The fitting engine can function to compute residual topologies (e.g., 575) and non-isolated topologies (e.g., 580, 582, 584, 586) for each destination and, optionally, for one or more backup trees. In some embodiments, the residual topology is a subset of non-isolated topologies where the destinations are all nodes, the matching qualifier is "match everything" and the priority is low so that more specific qualifiers and topologies match first.

Using previous strategies that relied only on isolated topologies, a portion of the capacity of link 510 would be consumed by isolated topology 520 and the remaining capacity of link 510 would be unused (or free) 525. That is, link 510 uses only isolated topologies and, using these previous strategies, isolated topology 520 would reserve a portion of the capacity of link 510 for traffic between nodes connected by link 510 (nodes not illustrated in FIG. 5). Thus, a portion of the capacity of link 510 would be unused (525) and another portion (520) would be reserved for use whether or not that capacity is currently being utilized. This strategy is potentially very inefficient, but can provide performance guarantees.

However, as described herein, non-isolated topologies can be utilized to share network links, which can result in much more efficient network capacity utilization. In one embodiment, link 510 can provide capacity for isolated topology 520 and can provide free capacity 525. Thus, techniques for supporting non-isolated topologies can work in association with links utilized by isolated topologies.

Link 570, provides capacity for residual topology 575 as well as multiple non-isolated topologies 580, 582, 584, 586. In some embodiments, link 570 can provide an alternate path for a portion of a network graph including isolated topology 520. That is, should link 510 fail such that isolated topology 520 cannot operate as desired, one or more non-isolated topologies (e.g., 584 on link 570) can be utilized as backups or alternates. Other uses for non-isolated topologies can also be provided. In one embodiment, the computation order for network topologies is isolated, non-isolated and residual. These non-isolated topologies can be utilized for links that do not require the performance guarantees of the isolated topologies discussed above.

In some embodiments, a step or two higher in the system, a user can use a user interface (UI) or application program interface (API) to create parameters for non-isolated topologies. There the parameters for a topology can be provided such as the switches involved, isolated or non-isolated selection, hop-count sensitivity, traffic expected, and packet qualification descriptions. Techniques for supporting non-isolated topologies can co-exist, or function side-by-side, with links utilized by isolated topologies.

Figure 6:
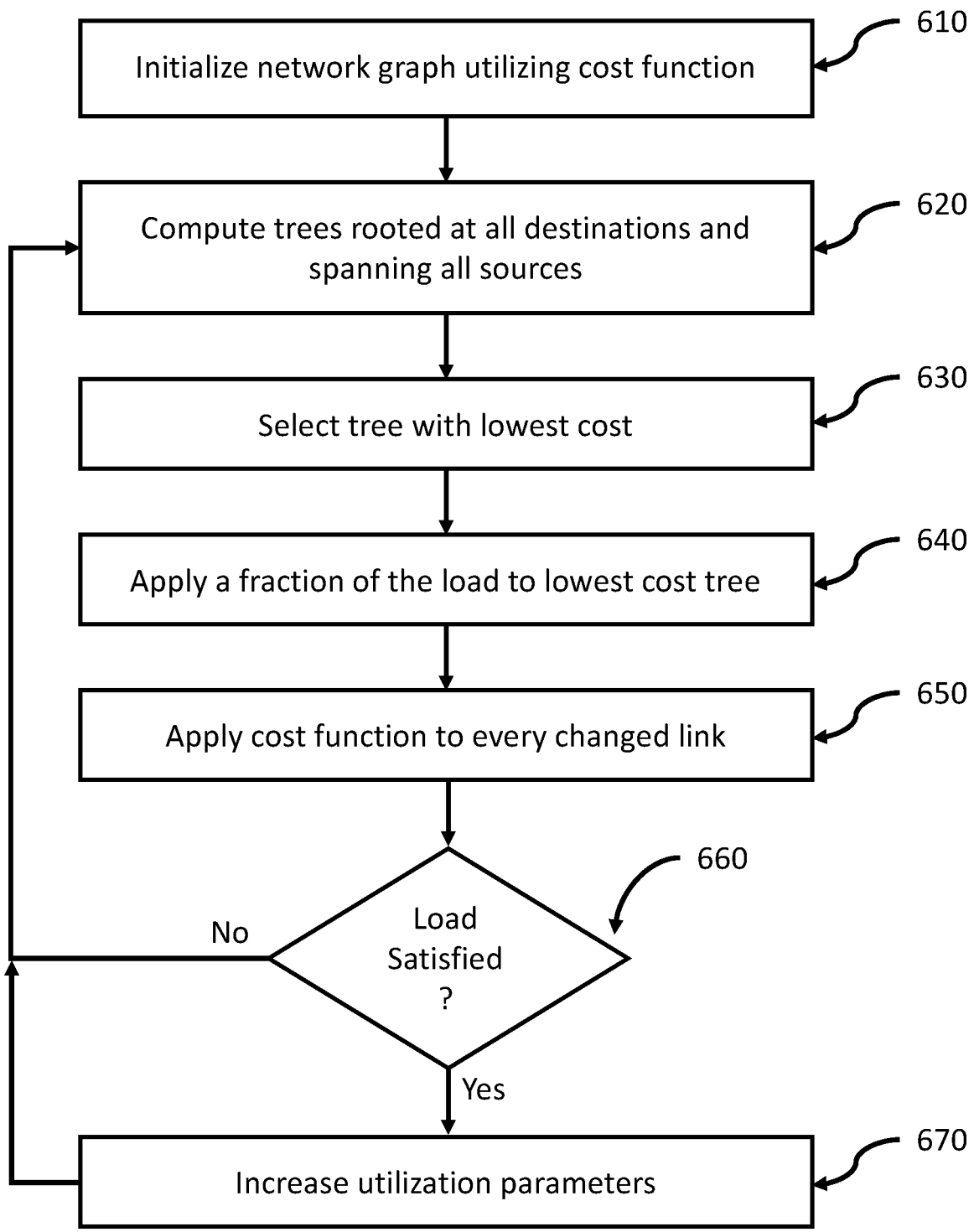
FIG. 6 is a flow diagram of one embodiment of a technique for generating topologies including non-isolated topologies.

FIG. 6 is a flow diagram of one embodiment of a technique for generating topologies including non-isolated topologies. The techniques of FIG. 6 can be provided by, for example, one or more fitting engines that can be part of one or more central controllers, as illustrated above.

In various embodiments, the fitting engine can utilize a network link state and topology description as input and produce fabric graphs as outputs while consuming network capacity. A load-based cost function can be used along with a shortest path function to consume capacity and to produce the graphs. In one embodiment, for each non-isolated topology description, the network load state output of a previous graph computation can be used an input for the subsequent graph computation.

In one embodiment, the following inputs can be utilized to determine one or more non-isolated topologies: a network graph, existing link loads, a list of isolated links (if any), a set of sources and destinations, a traffic matrix, an inertia factor (used to control the tendency to spread the link load) and cost function parameters (e.g., overcommit fraction and curve steepness).

In one embodiment, the topology generation process generally includes initializing, at block 610, a network graph by applying a cost function (e.g., $c=f(x)$, where $x$ is the link utilization) to every link. In one embodiment, the cost function provides a cost "C" based on utilization of load and/or capacity. The "load" can be referred to as the total load on a link due to previously computed topologies and the portion of the traffic matrix consumed by the current topology. In one example embodiment, a cost function can be a hyperbola that approaches infinite cost as the utilization approaches full utilization (e.g., 1). For example, using an over commit value "y" with the cost and an inertia factor of "A":

$$x>y: C=\text{infinity, otherwise } C=1+1/(A(1-x/y))-1/A$$

Thus, as one example, a two-hop lightly loaded path can be preferred over a more heavily loaded direct path.

Trees rooted at all destinations and spanning the sources (e.g., using a shortest path strategy) can be computed at block 620. In one embodiment, trees can be computed for all destinations and all potential sources for those destinations. Under certain conditions, some subset can be selected.

A tree with the lowest cost (e.g., where tree cost is the sum of the costs of the individual links in the tree) is selected at block 630. Because the lowest cost (lowest utilization) trees are selected, this approach tends to fill the links of the fabric relatively evenly. With the residual topology computed with all nodes as sources and destinations, the evenness of the load distribution can be measured and utilized to determine the quality of the fit.

If the cost is lower than any saved destination, the resulting tree can be added to the list of trees. In one embodiment, the resulting tree is added if the cost of the tree is less than any saved tree by at least an inertia factor. Various inertia factors can be utilized, for example, 1.5, 1.2, 1.1, 1.05, 1.003 or 1.00001. In some embodiments, a lower inertia factor can result in a broader spread of the load.

In one embodiment, either the newly-added tree or the previously-existing minimum cost tree can be selected at block 640. Some or all of the remaining link load can be applied to the selected tree. In one embodiment, a default fraction of the remaining load can be applied to the newly added tree. Incremental addition of multiple non-isolated topology trees is described in greater detail below.

In one embodiment, the cost function is applied to every changed link at block 650, in response to use of new trees. One example of a cost function is described above. Other cost functions can also be applied. If the load is not fully satisfied ("NO" at block 660), at least parts of the process of FIG. 6 (particularly, blocks 620, 630, 640, 650) can be repeated until the load is determined to be satisfied at block 660. In some embodiments, when the load is satisfied ("YES" at block 660), utilization parameters can be modified (e.g., increased) and the process (blocks 620, 630, 640, 650, 660) can be repeated to provide additional non-isolated topologies on the links using the modified utilization parameters from the previous iteration. An initial load state can be persisted for use in generating partial fit graphs (which can include non-isolated topologies). Various statistics can be measured to be utilized in tree generation, for example, path length mean and standard deviation, link utilization mean and standard deviation, and/or fraction of total links used.

In one embodiment, a traffic matrix can be used to determine whether a flow should be admitted to a topology and to set policing and shaping properties. In one embodiment, to keep a flow that has exceeded its traffic matrix from impinging on other flows, a form of policing, scheduling and/or traffic shaping can be used.

In some embodiments, in order to provide support for generation of non-isolated topologies, one or more of the following characteristics/parameters can be provided in association with the process of FIG. 6. Any sources or destinations specified for the tree computation are honored. Thus, subsets of sources and/or destinations can be utilized, if desired. The tree generation technique can be repetitively applied to a network graph with increasing utilization. This can be particularly useful when a non-isolated link load output is fed into the subsequent round of computations/tree generation. Different cost functions with different overcommit levels can be utilized for isolated and non-isolated topologies.

Using traditional techniques, when a tree fit is computed, all topologies and flows are computed/recomputed and applied to provide a "full fit", that is, a network tree rooted at all destinations and spanning all sources computed and applied to network links. A full fit may be disruptive in that some packets may be lost as a result of an isolated topology exclusive use of links.

The packets may be lost as a result of switch forwarding tables being rebuilt. The extent of this packet loss may be unknown. Also, applications using reliable transport like Transmission Control Protocol (TCP), are unaware of packet loss. Nevertheless, incremental or partial fits can help matters. When utilizing non-isolated topologies, new topologies can be added to switches without recomputing existing topologies to provide a "partial fit." The partial fit is efficient both in terms of computation and delivery time, and in providing non-disruptive packet forwarding at the switch because not all destinations and sources must be computed and applied.

At the limit, with no isolated topologies, all topologies are non-isolated including residual topologies. In this case, all of the topologies can be added or deleted via the partial fit process.

When processing non-isolated topologies at full fit time, the link load output of one topology computation becomes the link load input of the next topology computation. In one embodiment, the link load is persisted after the full fit to be utilized as an input when subsequently performing partial fit topology computations. In some embodiments, in a full fit, all state information is rebuilt from the topology descriptions (e.g., user objects) maintained in a database. Previous fitting and switch state is cleared.

Under certain conditions, at the partial fit time the network may have changed since the last topology computation, so new unloaded links can be added to the load map. At the switch level additions of non-isolated topologies can be performed while preserving existing switch state.

The load map refers to the load on every link that is not an isolated link. The full-fit procedure will compute the isolated topologies, removing the links consumed from consideration in later computations. Next, the non-isolated topologies are computed, updating the load map in the process. Finally, the residual computation adds its load to the load map. The load map can be persisted for future use.

In various embodiments, a partial fit may be used to add or delete one or more isolated topologies. The fitting engine can read the load map into memory, set the costs of links on its input network graph according to the loads, and compute added topologies, which increases the relevant entries in the load map. For deletions, computation is unnecessary, but the link loads in the load map are reduced.

Figure 7:
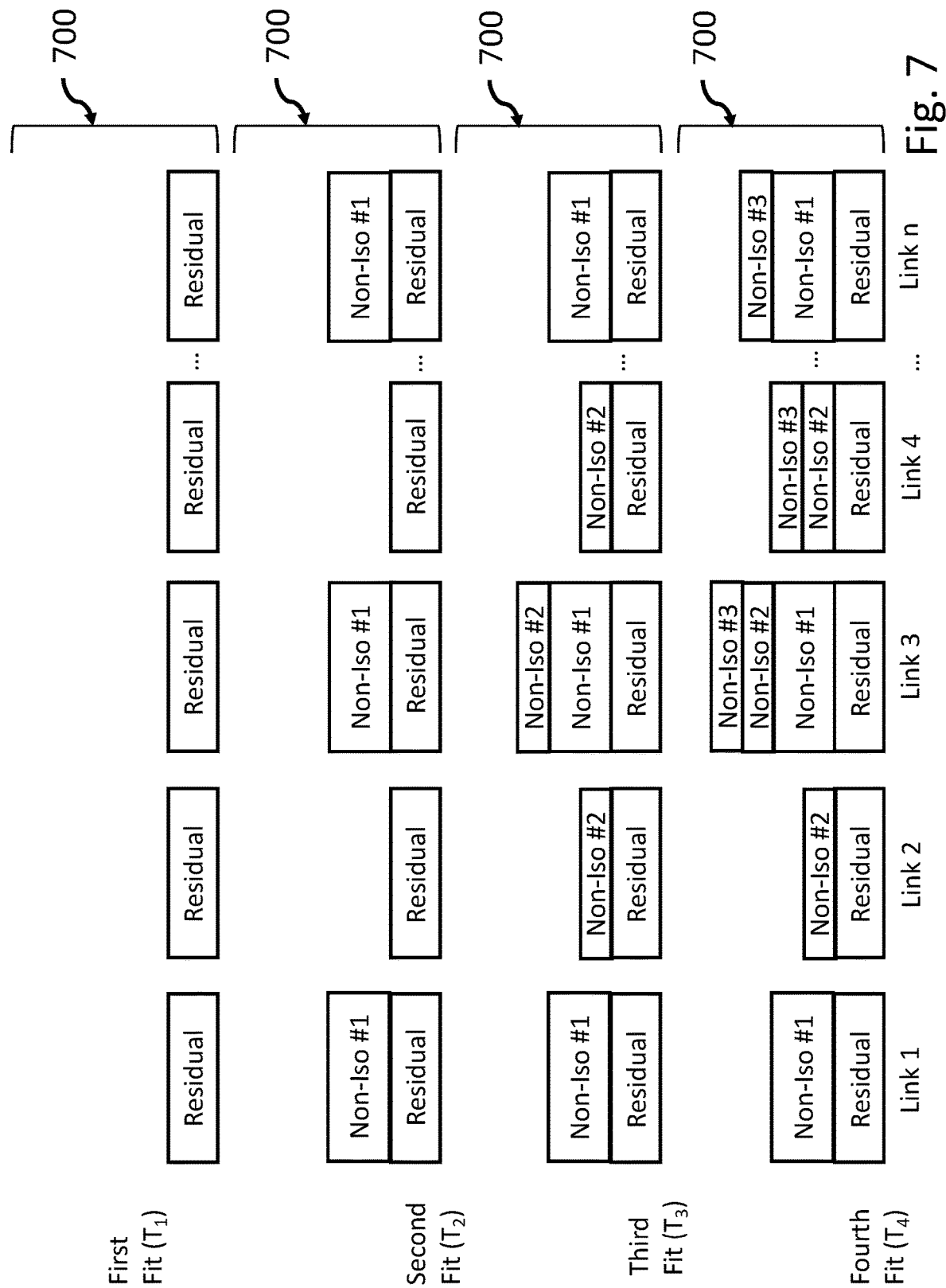
FIG. 7 is an example time sequence of fits and placement of network node graphs in terms of link consumption.

FIG. 7 is an example time sequence of fits and placement of network node graphs in terms of link consumption. Each link (e.g., Link 1, Link 2, Link 3, Link 4 . . . Link n) has an associated link capacity (700). For ease of description the link capacity is illustrated as the same for all links; however, actual implementations do not require equal link capacity.

At time T1, a residual or full fit is performed, which in the example of FIG. 7, is a full fit where the residual topologies for each link are established. Thus, at time T1 each link has reserved its corresponding residual topology capacity. At time T2, one or more non-isolated topologies (Non-Iso #1) can be added to network switches (e.g., for Link 1, Link 3 and Link n) to further allocate link capacity for links corresponding to the first non-isolated topology. Note that the residual topology allocations are not disturbed during this partial fit process.

Similarly, at time T3 (Third Fit) and at time T4 (Fourth Fit) additional partial fits can be performed. In the example of FIG. 7, at time T3 one or more non-isolated topologies (Non-Iso #2) can be added to network switches (e.g., for Link 2, Link 3 and Link 4) to further allocate link capacity for links corresponding to the second non-isolated topology. Continuing the example of FIG. 7, at time T4 one or more non-isolated topologies (Non-Iso #3) can be added to network switches (e.g., for Link 3, Link 4 and Link n) to further allocate link capacity for links corresponding to the third non-isolated topology. Changes to the network fabric generally do not prevent a partial fit. In some embodiments a graph can extend to a switch not in the residual topology. In some embodiments, at the time of a full fit, non-isolated graphs are processed in the partial fit order.

Figure 8:
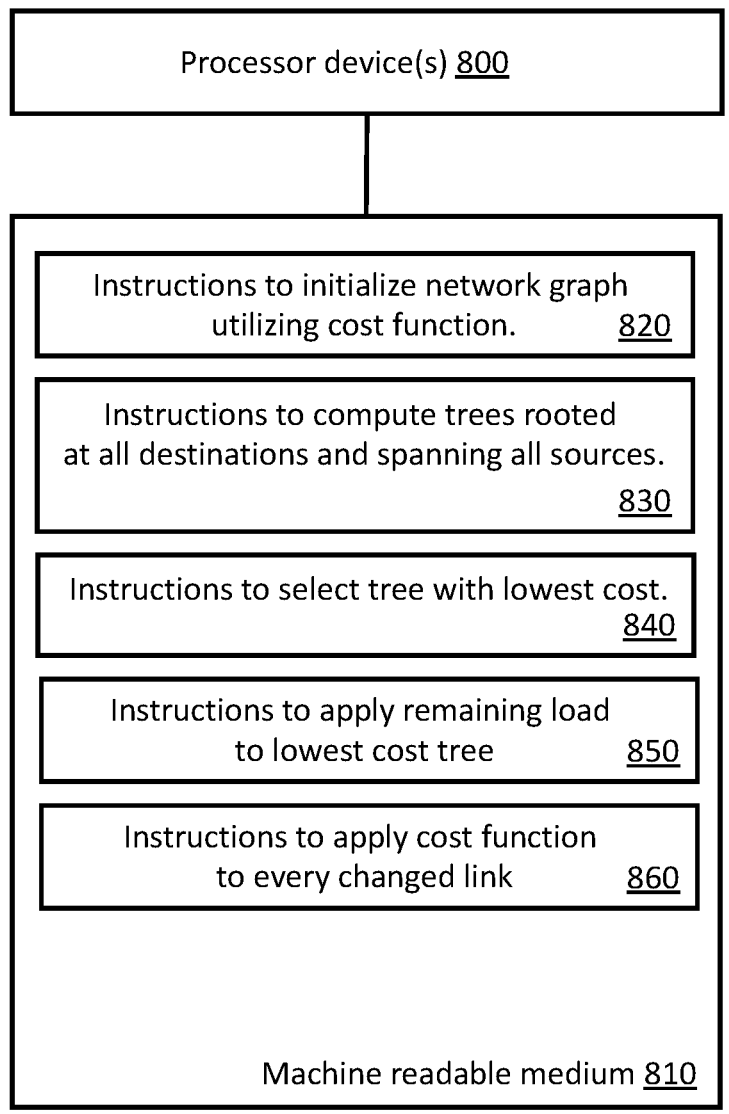
FIG. 8 is a block diagram of one embodiment of a processing resource and a machine readable medium encoded with example instructions to utilize non-isolated topologies.

FIG. 8 is a block diagram of one embodiment of a processing resource and a machine readable medium encoded with example instructions to utilize non-isolated topologies. Machine readable medium 810 is non-transitory and is alternatively referred to as a non-transitory machine readable medium 810. In some examples, the machine readable medium 810 may be accessed by processor device(s) 800. Processor device(s) 800 and machine readable medium 810 may be included in network controllers, such as central controller 102 or nodes 100. The processor device(s) 800 and instructions encoded on the machine readable medium 810 may be used to implement the central controller 102 or the process of FIG. 6 and/or may include any of the above-described functionality of the central controller 102 or the process of FIG. 6.

Machine readable medium 810 may be encoded with example instructions 820, 830, 840, 850 and 860. Instructions 820, 830, 840, 850 and 860, when executed by the processor device(s) 800, may implement various aspects of techniques to provide and utilize non-isolated topologies.

In some embodiments, instructions 820 cause the processor to initialize a network graph utilizing a cost function. The network graph can utilize isolated or non-isolated topologies. Instructions 830 can cause the processor to compute trees rooted at all destinations and spanning all sources.

Instructions 840 can cause the processor to select the tree with the lowest associated cost. Instructions 850 can cause the processor to apply the remaining load to the lowest cost tree. Instructions 860 can cause the processor to apply the cost function to all changed links.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system.

The term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having instructions stored thereon, the instructions, when executed by one or more hardware processors, are configurable to cause updating of a forwarding table in a switching node of a network including the switching node, the instructions to cause the one or more hardware processors to:
   generate at least one primary tree having multiple connection graphs for each node in the network, wherein each connection graph has at least one ordered list of one or more network node connections, and wherein generating the multiple connection graphs comprises performing a full network fit process for each node in the network;
   cause the at least one primary tree to be stored in at least one switching node to be used for network switch functionality;
   generate additional connection graphs for one or more network nodes with connections based at least on network link capacity, wherein a respective additional connection graph comprises at least one non-isolated network link that is shared among multiple network node connections, and wherein generating the additional connection graphs comprises performing a partial network fit process without disturbing the multiple connection graphs in the primary tree; and
   cause the additional connection graphs to be stored in the at least one switching node to be used for subsequent network switch functionality.

2. The non-transitory computer-readable medium of claim 1, wherein the multiple connection graphs are generated based at least on a load based cost function and a shortest path algorithm.

3. The non-transitory computer-readable medium of claim 1, wherein the multiple connection graphs are generated based at least on network link states and a topology description.

4. The non-transitory computer-readable medium of claim 1, wherein generating the connection graphs for each switching node in the network comprises generating network node trees for all destination nodes and spanning all source nodes in the network.

5. The non-transitory computer-readable medium of claim 1, wherein multiple rounds of additional connection graphs are generated and ordered according to link load.

6. A network controller comprising:
   one or more interfaces to communicate topology information to and from one or more corresponding network nodes providing switching functionality;
   a database to store topology information;
   a fitting engine communicatively coupled with the one or more interfaces and with the database, the fitting engine to:
      generate at least one primary tree having multiple connection graphs for each node in the network, wherein each connection graph has at least one ordered list of one or more network node connections, and wherein wherein generating the multiple connection graphs comprises performing a full network fit process for each node in the network;
      cause the multiple connection graphs to be transmitted to one or more of the network nodes,
      cause the multiple connection graphs to be stored in the database,
      generate additional connection graphs for one or more network nodes with connections based at least on network link capacity, wherein a respective additional connection graph comprises at least one non-isolated network link that is shared among multiple network node connections, and wherein generating the additional connection graphs comprises performing a partial network fit process without disturbing the multiple connection graphs in the primary tree,
      cause at least one of the additional connection graphs to be transmitted to a selected subset of the network nodes;
   cause the additional connection graphs to be stored in the database.

7. The system of claim 6, wherein the multiple connection graphs are generated based at least on a load based cost function and a shortest path algorithm.

8. The system of claim 6 wherein the multiple connection graphs are generated based at least on network link states and a topology description.

9. The system of claim 6 wherein generating the multiple connection graphs for each node in the network comprises generating network node trees for all destination nodes and spanning all source nodes in the network.

10. The system of claim 6, wherein multiple rounds of additional connection graphs are generated and ordered according to link load.

11. A method of updating a forwarding table in a network switch of a network including the network switch, the method comprising:
   generating at least one base connection graph having multiple connection graphs for each node in the network, wherein each connection graph has at least one ordered list of one or more network node connections, and wherein generating the multiple connection graphs comprises performing a full network fit process for each node in the network;

causing the at least one base connection graph to be stored in at least one network switch to be used for network switch functionality;

generating additional connection graphs for one or more network nodes with connections based at least on network link capacity, wherein a respective additional connection graph comprises at least one non-isolated network link that is shared among multiple network node connections, and wherein generating the additional connection graphs comprises performing a partial network fit process without disturbing the multiple connection graphs in the base connection graph; and causing the additional connection graphs to be stored in the at least one network switch to be used for subsequent network switch functionality.

12. The method of claim 11, wherein the multiple connection graphs are generated based at least on a load based cost function and a shortest path algorithm.

13. The method of claim 11, wherein the multiple connection graphs are generated based at least on network link states and a topology description.

14. The method of claim 11, wherein generating the multiple connection graphs for each node in the network comprises generating network node trees for all destination nodes and spanning all source nodes in the network.

15. The method of claim 11, wherein multiple rounds of additional connection graphs are generated and ordered according to link load.

* * * * *